(12) United States Patent
Kubo et al.

(10) Patent No.: US 9,096,936 B2
(45) Date of Patent: Aug. 4, 2015

(54) METAL STRUCTURAL BODY-CONTAINING POLYMER FILM, METHOD FOR MANUFACTURING METAL STRUCTURAL BODY-CONTAINING POLYMER FILM, AND METHOD FOR MANUFACTURING PATTERNED STRUCTURAL BODY

(71) Applicant: CANON KABUSHIKI KAISHA, Tokyo (JP)

(72) Inventors: Wataru Kubo, Inagi (JP); Kazuhiro Yamauchi, Suntou-gun (JP); Kenji Yamada, Yokohama (JP); Mamiko Kumagai, Yokohama (JP); Kyoko Kumagai, Toyota (JP); Toshiki Ito, Kawasaki (JP); Norishige Kakegawa, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/174,771

(22) Filed: Feb. 6, 2014

(65) Prior Publication Data
US 2014/0217063 A1 Aug. 7, 2014

Related U.S. Application Data

(62) Division of application No. 12/632,944, filed on Dec. 8, 2009, now abandoned.

(30) Foreign Application Priority Data

Dec. 11, 2008 (JP) .................................. 2008-316040

(51) Int. Cl.
| | |
|---|---|
| *C03C 15/00* | (2006.01) |
| *C23F 1/00* | (2006.01) |
| *B32B 15/08* | (2006.01) |
| *C25D 5/02* | (2006.01) |
| *C25D 13/04* | (2006.01) |
| *B41M 3/00* | (2006.01) |

(52) U.S. Cl.
CPC . *C23F 1/00* (2013.01); *B32B 15/08* (2013.01); *C25D 5/02* (2013.01); *C25D 13/04* (2013.01); *B41M 3/00* (2013.01); *Y10T 428/24917* (2015.01)

(58) Field of Classification Search
USPC ..................... 216/41, 37; 428/461, 625, 626
See application file for complete search history.

(56) References Cited

U.S. PATENT DOCUMENTS 4,603,092 A * 7/1986 Luch .............................. 428/626
5,021,129 A * 6/1991 Arbach et al. ................. 205/126

* cited by examiner

*Primary Examiner* — Duy Deo
*Assistant Examiner* — Maki Angadi
(74) *Attorney, Agent, or Firm* — Canon U.S.A. Inc., IP Division (57) ABSTRACT

A method for manufacturing a patterned structural body by which a patterned structural body having a micropattern can be manufactured, a metal structural body-containing polymer film that can be used in the manufacture of the patterned structural body, and a method for manufacturing the polymer film are provided. The metal structural body-containing polymer film comprises a polymer film that includes a block copolymer having an ion-conductive segment and a non-ion-conductive segment and has a microphase-separated structure including ion-conductive domains and non-ion-conductive domains, and a metal structural body localized at the ion-conductive domains.

9 Claims, 7 Drawing Sheets

METAL STRUCTURAL BODY-CONTAINING POLYMER FILM, METHOD FOR MANUFACTURING METAL STRUCTURAL BODY-CONTAINING POLYMER FILM, AND METHOD FOR MANUFACTURING PATTERNED STRUCTURAL BODY

CROSS REFERENCE TO RELATED APPLICATIONS

This application is a Divisional of U.S. patent application Ser. No. 12/632,944 filed Dec. 8, 2009, which claims priority to Japanese Patent Application No. 2008-316040, filed Dec. 11, 2008, each of which are hereby incorporated by reference herein in their entireties.

BACKGROUND OF THE INVENTION

1. Field of the Invention

The present invention relates to a metal structural body-containing polymer film, a method for manufacturing a metal structural body-containing polymer film, and a method for manufacturing a patterned structural body.

2. Description of the Related Art

Japanese Patent Laid-Open No. 2004-306404 and U.S. Pat. No. 6,054,607 describe an organic thin film that has a microphase-separated structure formed by a block copolymer in which mutually incompatible polymer chains are bonded together and includes metal microparticles in one phase of the microphase-separated structure, the film being suitable for applications as an optical recording medium.

Further, Miri Park et al., Science, 276, 1401-1404 (1997) describes a method for forming a pattern by using a structural body including a substrate and a film that has a microphase-separated structure formed by a block copolymer in which mutually incompatible polymer chains are bonded together and includes osmium oxide in one phase of the microphase-separated structure and etching by using the one phase as a mask.

However, a problem associated with the pattern formation method described in Miri Park et al., Science, 276, 1401-1404 (1997) is that the aspect ratio of the obtained patterned structural body is small because of a small difference in etching rate between a polystyrene phase and a phase including osmium oxide in polybutadiene, those two phases forming the microphase-separated structure.

SUMMARY OF THE INVENTION

The invention provides a method for manufacturing a patterned structural body that is suitable for manufacturing a patterned structural body of a larger aspect ratio, a metal structural body-containing polymer film that can be used in the manufacture of the patterned structural body, and a method for manufacturing the metal structural body-containing polymer film.

The first aspect of the invention relates to a metal structural body-containing polymer film, comprising a polymer film that includes a block copolymer having an ion-conductive segment and a non-ion-conductive segment and has a microphase-separated structure including ion-conductive domains and non-ion-conductive domains, and a metal structural body localized at the ion-conductive domains.

The second aspect of the invention relates to a method for manufacturing a metal structural body-containing polymer film, comprising the steps of:

preparing a metal structural body-containing polymer film that includes a block copolymer having an ion-conductive segment and a non-ion-conductive segment and has a microphase-separated structure including ion-conductive domains and non-ion-conductive domains; and localizing and depositing a metal structural body in the ion-conductive domains.

The third aspect of the invention relates to a method for manufacturing a patterned structural body, comprising the steps of:

preparing a composite body including a metal structural body-containing polymer film that is obtained according to the second aspect of the invention and a base material; and etching the base material by using the metal structural body as a mask.

Further features of the present invention will become apparent from the following description of exemplary embodiments with reference to the attached drawings.

DESCRIPTION OF THE EMBODIMENTS

The first aspect of the invention relates to a metal structural body-containing polymer film, comprising: a polymer film that includes a block copolymer having an ion-conductive segment and a non-ion-conductive segment and has a microphase-separated structure including ion-conductive domains and non-ion-conductive domains, and a metal structural body localized at the ion-conductive domains.

Figure 1:
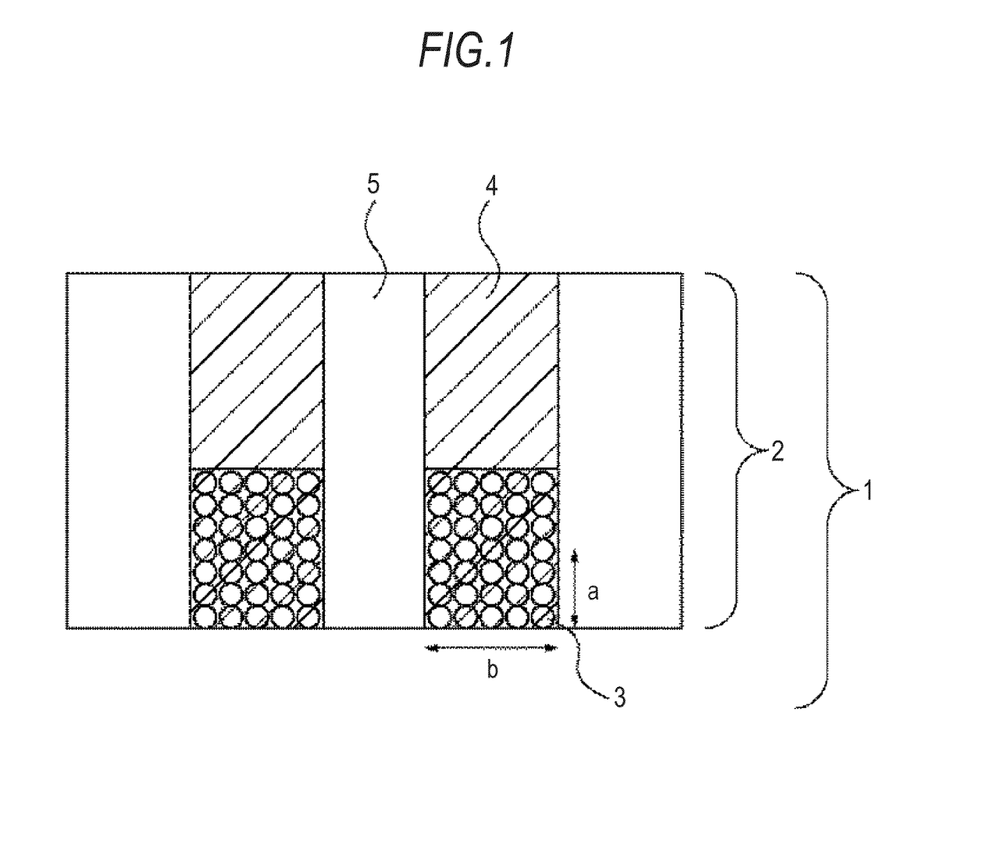
FIG. 1 is a schematic diagram illustrating a cross-section of a metal structural body-containing polymer film that is an example of the invention.

FIG. 1 is a schematic diagram illustrating a cross section obtained by cutting a metal structural body-containing polymer film that is an example of the first aspect of the invention in the direction parallel to the thickness direction of the film. In the figure, the reference numeral 1 represents a metal structural body-containing polymer film, 2—a polymer film having a microphase-separated structure, 3—a metal structural body, 4—an ion-conductive domain, and 5—a non-ion-conductive domain.

Components constituting the polymer film according to the first aspect of the invention will be described below.

The reference numeral 2 represents a polymer film having a microphase-separated structure including ion-conductive domains and non-ion-conductive domains. A cylindrical structure including a matrix portion and cylinder portions that have a thickness direction of the polymer film 2 as a longitudinal direction, as shown in FIG. 1, may be used as the microphase-separated structure of the polymer film 2. A cylindrical structure including a matrix portion and cylinder portions that have a direction parallel to the surface of the polymer film 2 as a longitudinal direction may be also used. The structure may be a co-continuous structure or a lamellar structure. Furthermore, one of the phases forming the structure is an ion-conductive domain and the other is a non-ion-conductive domain. Among the above-described structures, the preferred structure of the polymer film 2 is a cylindrical structure including a matrix portion and cylinder portions that have a thickness direction of the polymer film 2 as a longitudinal direction, as shown in FIG. 1.

The size of the microphase-separated structure is preferably 1-50 nm. The size of the microphase-separated structure as referred to herein means the following. For example, where the microphase-separated structure is a cylindrical structure, the size of the microphase-separated structure is the distance between one cylinder and a cylinder that is the closest to this cylinder. In a case of a sea-island structure, the size of the microphase-separated structure is the distance between one island and an island that is the closest to this island. Ina case of a lamellar structure, the size of the microphase-separated structure is the distance between one layer and a layer that is the closest to this layer and is formed in the same segment.

Figure 2:
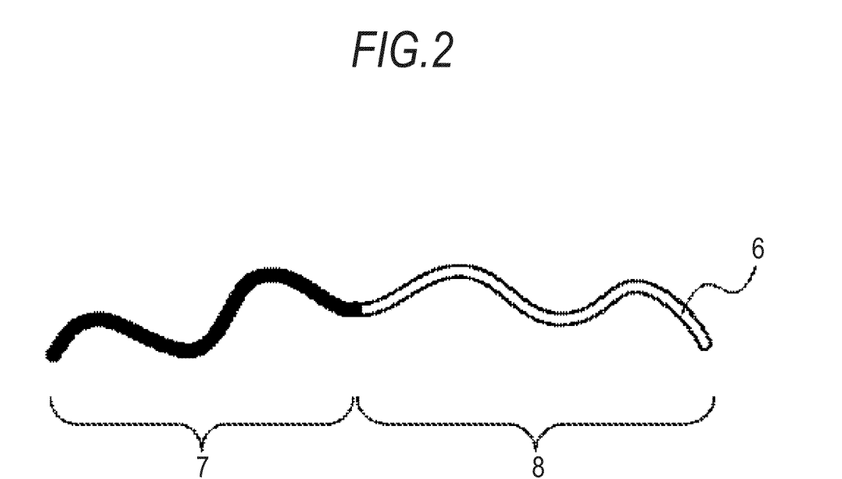
FIG. 2 is a schematic diagram illustrating an example of a block copolymer used in accordance with the invention.

Further, the polymer film 2 having the microphase-separated structure includes a block copolymer 6 including an ion-conductive segment A7 and a non-ion-conductive segment B8, as shown in FIG. 2. The ion-conductive segments A7 in different block copolymer bodies interact with each other, and the non-ion-conductive segment B8 in different block copolymer bodies also interact with each other. As a result, ion-conductive domains and non-ion-conductive domains of the polymer film 2 are formed and the microphase-separated structure is formed. The block copolymer is formed by connection of polymer chains of different types. Therefore, a phase-separated structure that is larger than the spread of respective polymer chains is difficult to produce. As a result, a microphase-separated structure that is a periodic self-organized structure of about 1 nm to 50 nm is formed. The ratio of ion conductivity (ion-conductive domain/non-ion-conductive domain) of the ion-conductive domains and non-ion-conductive domains is preferably equal to or greater than 10, more preferably equal to or greater than 100.

The ion-conductive segment A forming the block copolymer preferably has an ion exchange group. From the standpoint of conducting metal ions, an acidic group is preferred as the ion exchange group. Examples of such acidic groups include sulfonic acids, carboxylic acids, phosphoric acid, phosphonic acid, phosphinous acid. From the standpoint of easiness of synthesis and high degree of acid dissociation, sulfonic acid is preferred among them. The polymer may include an ion exchange group of one kind or ion exchange groups of two or more kinds.

The preferred examples of monomers constituting the ion-conductive segment A include monomers obtained by adding an ion exchange group to a diene monomer or an olefin monomer. More specific examples include styrene, (meta) acrylate, (meta)acrylamide, butadiene, isoprene, ethylene, and propylene including an ion exchange group (or a salt thereof). In order to increase the film strength, dimensional stability, and degree of acid dissociation of the polymer film and form a clearer phase-separated structure, it is preferred that fluorine be introduced in these monomers.

Any non-ion-conductive segment B may be used, provided it can be bonded to the ion-conductive segment A to form a microphase-separated structure.

Examples of monomers constituting such a non-ion-conductive segment B include polymers synthesized from monomers such as acrylic acid esters, methacrylic acid esters, styrene, derivatives thereof, conjugated dienes, and vinyl ester compounds. More specific examples include styrene and α-, o-, m-, p-alkyl, alkoxyl, halogen, haloalkyl, nitro, cyano, amido, and ester substituted styrene; polymerizable unsaturated aromatic compounds such as 2,4-dimethylstyrene, paradimethylaminostyrene, vinylbenzyl chloride, vinylbenzaldehyde, indene, 1-methylindene, acenaphthalene, vinyl naphthalene, vinyl anthracene, vinyl carbazole, 2-vinyl pyridine, 4-vinyl pyridine, and 2-vinyl fluorene; alkyl (meth)acrylates such as methyl(meth)acrylate, ethyl(meth) acrylate, n-propyl acrylate, n-butyl acrylate, 2-ethylhexyl (meth)acrylate, and stearyl(meth)acrylate; unsaturated monocarboxylic acid esters such as methyl crotonate, ethyl crotonate, methyl cinnamate, and ethyl cinnamate; fluoroalkyl(meth)acrylates such as trifluoroethyl(meth)acrylate, pentafluoropropyl(meth)acrylate, and heptafluorobutyl (meth)acrylate; siloxanyl compounds such as trimethylsiloxanyldimethylsilylpropyl(meth)acrylate, tris(trimethylsiloxanyl)silylpropyl(meth)acrylate, and di(meth) acryloylpropyldimethylsilyl ethers; hydroxyalkyl(meth) acrylates such as 2-hydroxyethyl(meth)acrylate, 2-hydroxypropyl(meth)acrylate, and 3-hydroxypropyl (meth)acrylate; amine-containing (meth)acrylates such as dimethylaminoethyl(meth)acrylate, diethylaminoethyl (meth)acrylate, and t-butylaminoethyl(meth)acrylate; hydroxyalkyl esters of unsaturated carboxylic acids such as crotonic acid 2-hydroxyethyl, crotonic acid 2-hydroxypropyl, and cinnamic acid 2-hydroxypropyl; unsaturated alcohols such as (meth)acryl alcohol; unsaturated (mono)carboxylic acids such as (meth)acrylic acid, crotonic acid and cinnamic acid; epoxy group-containing (meth)acrylic acid esters such as glycidyl(meth)acrylate, glycidyl α-ethyl acrylate, glycidyl α-n-propyl acrylate, glycidyl α-n-butyl acrylate, (meth)acrylic acid-3,4-epoxybutyl, (meth)acrylic acid-6,7-epoxyheptyl, α-ethylacrylic acid-6,7-epoxyheptyl, o-vinylbenzylglycidyl ether, m-vinylbenzylglycidylether, p-vinylbenzylglycidyl ether, (meth)acrylic acid-β-methylglycidyl, (meth)acrylic acid-β-ethylglycidyl, (meth)acrylicacid-β-propylglycidyl, α-ethylacrylic acid-β-methylglycidyl, (meth)acrylic acid-3-methyl-3,4-epoxybutyl, (meth) acrylic acid-3-ethyl-3,4-epoxybutyl, (meth)acrylic acid-4- methyl-4,5-epoxypentyl, (meth)acrylic acid-5-methyl-5,6-epoxyhexyl, (meth)acrylic acid-β-methylglycidyl, and (meth)acrylic acid-3-methyl-3,4-epoxybutyl; mono- and diesters of the above-described species; maleimides such as N-methylmaleimide, N-butylmaleimide, N-phenylmaleimide, N-o-methylphenylmaleimide, N-m-methylphenylmaleimide, N-p-methylphenylmaleimide, N-o-hydroxyphenylmaleimide, N-m-hydroxyphenylmaleimide, N-p-hydroxyphenylmaleimide, N-methoxyphenylmaleimide, N-m-methoxyphenylmaleimide, N-p-methoxyphenylmaleimide, N-o-chlorophenylmaleimide, N-m-chlorophenylmaleimide, N-p-chlorophenylmaleimide, N-o-carboxyphenylmaleimide, N-p-carboxyphenylmaleimide, N-p-nitrophenylmaleimide, N-ethylmaleimide, N-cyclohexylmaleimide, and N-isopropylmaleimide, and also (meth)acrylonitrile, and vinyl chloride.

In FIG. 2, an A-B diblock copolymer, which is a copolymer including the ion-conductive segment A7 and non-ion-conductive segment B8 is described as a block copolymer constituting the polymer film 2, but the copolymer may be also an A-B-X-type or B-A-X-type block copolymer in which another segment (polymer) X is linked to an end of one segment (polymer chain) of the A-B diblock copolymer. In such a case, the segment X may be a segment (polymer) C that is different from the segments A and B, or a diblock copolymer of the segment C and a segment D that are different from the segments A and B. The segment X may be also the segment A or segment B, and the block copolymer may be an A-B-A-type or B-A-B-type block copolymer. The A-B-A-type or B-A-B-type block copolymer is preferred because the film has a mechanical strength higher than that of the A-B-type diblock copolymer.

The block copolymer constituting the polymer film 2 may be a star block copolymer in which a plurality of different polymers are linked to one chemical bond point, or a graft copolymer in which a plurality of different polymers are linked to side chains of one polymer chain. Furthermore, the copolymer may also be a gradient copolymer in which the monomer composition of the segment A and the monomer composition of the segment B varies continuously along the block copolymer chain.

The block copolymer constituting the polymer film 2 may have any molecular weight, provided that the microphase-separated structure can be formed, but because the higher is the molecular weight the higher is the polymer film strength, it is desirable that the number-average molecular weight be equal to or higher than 10,000.

The composition ratio of each segment in the block copolymer is not particularly limited, provided that the continuity of the ion conductive domains, such as formation of a globular domain by the ion conductive segment A, is not critically impaired.

The metal structural body 3 may include any metal as the main component, but from the standpoint of easiness of fabrication, it is preferred that any element selected from Ni, Ag, Sn, Cu, Zn, Cr, Au, Co, and Fe be contained as the main component. The metal structural body 3 may have any shape, but it is preferred that the length of the metal structural body 3 in the direction perpendicular to the main surface of the polymer film 2 be larger than the length of the metal structural body in the direction parallel to the main surface of the polymer film. The main surface of the polymer film as referred to herein is the plane with the largest area from among the polymer film planes. Further, for example, in a case where the polymer film having a metal structural body of the first aspect of the invention is used as an anisotropic conductive film, it is preferred that at least part of the metal structural body 3 be positioned at least on one main surface of the polymer film and that a portion that is not positioned on this surface be continuous with the portion positioned on this surface.

The reason why it is preferred that at least part of the metal structural body be positioned at least on one main surface can be explained as follows. For example, where a contact with properties inherent to a metal (for example, high electric conductivity and thermal conductivity) is to be initiated with the surface, where part of the metal structural body is positioned on the surface, the contact can be initiated with very few impediments. For example, where part of the metal structural body is positioned on the surface, the contact can be initiated without an adverse effect of a resistance component created by a polymer in a case where the metal structural body is embedded in the polymer. Further, the reason why it is preferred that a portion that is not positioned on the surface be continuous with the portion positioned on the surface can be explained as follows. For example, where properties inherent to a metal (for example, high electric conductivity and thermal conductivity) are wished to be demonstrated via the metal structural body, the continuous configuration of the metal structural body makes it possible to demonstrate these properties with very few impediments. For example, where the metal structural body is continuous, good conductivity can be demonstrated without an adverse effect of a resistance component caused by another substance (for example, an organic substance such as a dispersant) in a case where the metal structural body is made discontinuous and each of the disconnected structures is covered with the other substance. The presence of part of the metal structural body on the surface can be easily confirmed by visual observations of external appearance and under a microscope. The continuity of the metal structural body can be confirmed by cross-sectional observations and microscopic observations of a cross section. An example of a method for forming a metal structural body in which at least part of the metal structural body is positioned at least on one main surface of the polymer film and the portion that is not positioned on the surface is continuous with the portion positioned on the surface includes a method by which the one main surface is brought into contact with a conductor and a metal is deposited by electroplating from an electrolyte containing metal ions. In this case, because the metal is deposited on the conductor surface through the electrons provided from the conductor, the metal is inevitably positioned on the main surface. Further, because the portion that is not positioned on the surface is also deposited on the surface of the deposited metal by receiving electrons from the metal deposited through the electrons provided from the conductor (there is no other electron donor), the portion that is not positioned on the surface is inevitably formed continuous with the position that has been positioned on the surface.

Further, it goes without saying that the concept of "the metal structural body 3 being in contact with at least one main surface of the polymer film" includes a concept of the metal structural body 3 being in contact with two main surfaces of the polymer film.

Localization of the metal structural body 3 in the ion-conductive domain 4 means that the metal structural body 3 may be present on the surface of the polymer film 2 and the non-ion-conductive domain 5, but that the major part of the metal structural body is present inside the ion-conductive domain 4. The "major part" as referred to herein means 80% or more of the entire metal structural body present inside the polymer film 2 or on the surface thereof.

Japanese Patent Laid-Open No. 2004-306404 discloses a thin organic film including ultrafine metal particles protected with a dispersant only in one separation layer of a block copolymer that forms a microphase-separated structure. The differences between the present invention and the invention disclosed in Japanese Patent Laid-Open No. 2004-306404 will be described below.

In terms of configuration, the following two issues can be presented.

1. The metal contained in the thin organic film is in the form of ultrafine metal particles and can hardly be called a metal structural body.

2. Ultrafine metal particles contained in the thin organic film are protected by a dispersant and are not a continuum.

The following effects produced by the above-described configurations can be presented.

1. Because the metal contained in the thin organic film is in the form of ultrafine metal particles protected by the dispersant, where properties inherent to the metal are wished to be demonstrated, as described hereinabove, impediments are present between the ultrafine metal particles. By contrast, in accordance with the invention, the metal structural body is a continuum that represents a preferred configuration, thereby making it possible to demonstrate the metal properties without the adverse effect of the impediments.

The second aspect of the invention will be described below.

The second aspect of the invention relates to a method for manufacturing a metal structural body-containing polymer film, comprising the steps of:

(i) preparing a polymer film that includes a block copolymer having an ion-conductive segment and a non-ion-conductive segment and has a microphase-separated structure including ion-conductive domains and non-ion-conductive domains; and (ii) localizing and depositing a metal structural body in the ion-conductive domains.

The steps will be described below.
Process (i)

In the step (i), a polymer film is prepared that includes a block copolymer having an ion-conductive segment A and a non-ion-conductive segment B and has a microphase-separated structure including ion-conductive domains and non-ion-conductive domains.

The polymer film having a microphase-separated structure including ion-conductive domains and non-ion-conductive domains can be prepared, for example, by a method of forming a polymer film by coating a solution containing a block copolymer including an ion-conductive segment A and a non-ion-conductive segment B on a substrate surface and evaporating the solvent, or a method of unidirectionally extruding a molten block copolymer by using an extrusion molding machine or an injection molding machine.

When the former method is used, a coating means such as a bar coating method, a gravure coating method, a spin coating method, a dip coating method, a roll coating method, a spraying method, or a casting method can be used as a method for coating the solution containing a block copolymer including an ion-conductive segment A and a non-ion-conductive segment B on the substrate surface.

Examples of solvents that can be used in the solution containing a block copolymer including an ion-conductive segment A and a non-ion-conductive segment B include N,N-dimethylformamide (DMF), N-methyl-2-pyrrolidone (NMP), dimethylsulfoxide (DMSO), γ-butyrolactone, tetrahydrofuran, 1,4-dioxane, dichloromethane, chloroform, 1,2-dichloroethane, chlorobenzene, dichlorobenzene, ethylene glycol monomethyl ether, ethylene glycol monoethyl ether, propylene glycol monomethyl ether, propylene glycol monoethyl ether, methanol, ethanol, and propanol. A mixed solvent in which two or more of the aforementioned solvents are mixed may be also used.

When a film is formed by using a mixed solvent, the morphology of the block copolymer can be easily controlled and a microphase-separated structure is easily formed by accurately controlling the mixing ratio of the mixed solvent under moisture-free conditions, such as under dry air, nitrogen, or argon. In this case, it is preferred that water molecules contained in the solution containing the block copolymer be removed as thoroughly as possible.

In a case of a volume composition that is rich in the ion-conductive segment A (the volume ratio of the ion-conductive segment A is higher than the volume ratio of the non-ion-conductive segment B), it is preferred that a solvent be selected such that the ion-conductive segment A does not form a matrix phase.

A component other than the block copolymer may be added to the solution containing the block copolymer. For example, an additive such as a homopolymer of the same composition as the polymer chain constituting the block copolymer, or a plasticizer, an antioxidant, a radical trapping agent, a light stabilizer, a colorant, a crosslinking agent, and a catalyst may be added.

In a case where the latter method is used, the microphase-separated structure in which the cylindrical structure is oriented in the extrusion direction can be obtained when the melt of the block copolymer is subjected to the effect of shear stresses during the extrusion. The polymer film can be thereafter obtained by cutting the film obtained in the direction perpendicular to the extrusion direction.

In either of the methods, heating may be conducted after the film is obtained. The heating enhances the transition to a microphase-separated structure with a high degree of order. Where an external field is additionally applied during heating, a microphase-separated structure with better orientation can be obtained. The external field as referred to herein means an electric field, a magnetic field, or shear. The temperature is preferably equal to or higher than the glass transition temperature of the block copolymer, but where the external field is applied, the temperature may be equal to or lower than the glass transition temperature.

The microphase-separated structure of the polymer film can be confirmed under a transmission electron microscope, an atomic force microscope, or the like.
Process (ii)

In the process (ii) the metal structural body is localized and precipitated in the ion-conductive domains.

For example, plating on the ion-conductive domains of the polymer film obtained in the process (i) can be used for localizing and depositing the metal structural body in the ion-conductive domains.

The plating can be electroplating, electroless plating, or substitution plating. Among these types of plating, electroplating is preferred because the selection range of metal structural bodies that can be precipitated is wide and the film thickness can be controlled by an amount of electric charge.

The specific electroplating methods include forming the polymer film obtained in the process (i) on the surface of a working electrode, bringing the polymer film into contact with a solution containing metal ions, using an electrode including a metal element as a counter electrode, and applying a constant potential, a constant voltage, a constant current, or pulses to the working electrode. Among the aforementioned methods, a method in which the working electrode is subjected to constant-current electrolysis is preferred because the thickness of the metal structural body can be easily controlled. With such a method, metal ions contained in the solution including the metal ions are transferred into the ion-conductive domains of the polymer film and reduced to form a metal structural body. In this case, the metal ions are supplied via the ion-conductive domains (because they are ions) and are practically not supplied via the non-ion-conductive domain. As a result, the deposited metal grown along the ion-conductive domain that is the ion supply route and eventually a metal structural body-containing polymer film in which the metal structural body is localized in the ion-conductive domains is formed. Any working electrode can be used, provided that it is not corroded in the solution including the metal ions and conducts electricity. Examples of suitable materials include noble metals, Ni, Sn, Cu, Zn, Cr, and Fe, alloys thereof, carbon, impurity-doped semiconductors, and conductive metal oxides such as ITO. A metal structural body-containing polymer film can be obtained without transferring the obtained polymer film by using the working electrode as a substrate in the case where the solution including the block copolymer is coated on the substrate surface in the process (i). An electrode including the metal that forms the metal structural body can be used as the counter electrode. This is because the frequency of supplying the metal ions from the outside into the solution including the metal ions can be decreased. The preferred concentration of metal ions in the polymer film is equal to or greater than 0.001 M and equal to or less than 0.5 M, more preferably equal to or greater than 0.01 and equal to or less than 0.1 M. The current density in the polymer film is for example, equal to or higher than 0.1 $mAcm^{-2}$ and equal to or less than 100 $mAcm^{-2}$, more preferably equal to or greater than 1 $mAcm^{-2}$ and equal to or less than 30 $mAcm^{-2}$. Where the metal ion intensity and current density are within these ranges, uniform plating can be easily performed.

When electroplating is conducted, a reference electrode may be used in addition to the above-described electrodes. The merits of using the reference electrode include the possibility of conducting the potential-controlled electrolysis and monitoring the electric potential when current-controlled electrolysis is performed.

Further, where a gap is present between the polymer film and the working electrode, the probability of the metal structural body forming in the gap increases. Therefore, it is preferred that no gap be present. A method reducing the gap between the working electrode and polymer film includes, for example, forming a polymer film on the working electrode surface and then applying a pressure from the outside to the polymer film.

In the electroless plating process, for example, the surface of the electrode, or the surface of the polymer film that comes into contact with the electrode, or the surface of the electrode that comes into contact with the polymer film can be pretreated to provide reactive points for metal deposition. By conducting the pretreatment, it is possible to localize the metal structural body in the region close to the surface inside the ion-conductive domains. For example, the pretreatment method includes applying a substance serving as a catalyst of electroless deposition reaction, such as palladium. Examples of methods for applying the substance serving as a catalyst include dip coating, screen printing, and sputtering.

For example, the following method can be used for substitution plating. Thus, first, elements with a comparatively high ionization tendency, such as nickel, iron, and silicon, are localized on the polymer film surface by applying the elements to the polymer film surface by a suitable method such as sputtering, plating, printing, dip coating, or bar coating or by bringing the polymer film into contact with an electrode including these elements. Then, the polymer film having these elements present on the surface thereof is brought into contact with a solution including ions of elements with a comparatively low ionization tendency, such as gold and copper. As a result, the elements with a comparatively high ionization tendency are substituted by the ions of the elements with a comparatively low ionization tendency, the elements with a comparatively high ionization tendency become ions, and the ions of the elements with a comparatively low ionization tendency become elements. When substitution plating is used, a thin metal structural body is easily formed on the ion-conductive domain.

In any of the above-described plating methods, an additive can be added, if necessary, to the solution including the metal ions that are brought into contact with the polymer film. Examples of the additive include a support salt, a surfactant, a buffer agent, a chelating agent, and a glossing agent.

Further, with any of the above-described plating methods, the metal structural body is deposited from the surface that is brought into contact with the electrode in the ion-conductive domain of the polymer film. Therefore, the metal structural body grows from the vicinity of the surface in the ion-conductive domains.

The formed metal structural body can easily confirmed by visually observing the external appearance. More specifically, the surface and cross-section of the metal structural body-containing polymer film can be confirmed by observations conducted by using an electron microscope, in particular a scanning electron microscope. In this case, the metal structural body at the surface and in the cross section can be easier observed if the metal structural body-containing polymer film is immersed into a solvent that can dissolve the polymer film or if the metal structural body-containing polymer film is calcined. The presence of the metal structural body in the polymer film can be also confirmed with an energy-dispersed fluorescent X-ray analyzer or by inductively coupled plasma spectroscopy in which the metal structural body-containing polymer film is decomposed.

In a case where the obtained metal structural body-containing polymer film is peeled off from the electrode, a peeling film for facilitating the peeling may be formed in advance on the electrode surface. In such a case, the peeling film sometimes remains on the surface of the obtained metal structural body-containing polymer film.

U.S. Pat. No. 6,054,507 discloses a method for forming a composite by decomposing and eluting one phase of a block polymer that forms a microphase-separated structure, thereby forming micropores and them depositing fine metal particles by a plating method.

The differences between the present invention and the invention according to U.S. Pat. No. 6,054,507 will be described below.

1. In the process described in U.S. Pat. No. 6,054,507, pores are formed by decomposing and eluting one phase of a block polymer and fine metal particles are deposited in the pores. That is, the fine metal particles are deposited into a space from which the polymer has been removed. By contrast, in accordance with the present invention, a metal is deposited in the ion-conductive domains of a polymer film having a microphase-separated structure including the ion-conductive domains and non-ion-conductive domains.

2. By contrast with the process described in U.S. Pat. No. 6,054,507, in the process in accordance with the present invention, it is not necessary to form pores by decomposing and eluting one phase of the block copolymer, as a separate process (U.S. Pat. No. 6,054,507 describes a process in which one phase of a polymer film is decomposed by oxidation and washed with a concentrated acid as an example of such a process). Therefore, the processing cost is reduced because the number of processes is decreased and the deterioration of the microphase-separated structure is inhibited because the process causing the deterioration of the microphase-separated structure of the polymer is unnecessary (it is impossible to cause absolutely no deterioration). The resultant merit is, for example, in that when a patterned structural body is formed using the metal structural body prepared from the microphase-separated structural body as a mask, the structural body pattern is sharpened and the edge shape is clarified because the mask shape has not deteriorated.

The third aspect of the invention will be described below.

The third aspect of the invention relates to a method for manufacturing a patterned structural body, comprising the steps of:

(I) preparing a composite body including a metal structural body-containing polymer film that is obtained according to the second aspect of the invention and a base material that is in contact with the metal structural body-containing polymer film; and etching the base material by using the metal structural body as a mask.

FIG. 3 is a schematic diagram illustrating an example of the third aspect of the invention. The step (I) is shown in FIGS. 3A-B and the step (II) is shown in FIGS. 3B-C.

Figure 3A:
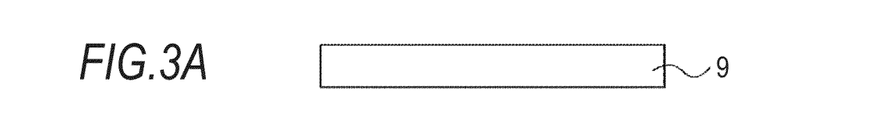
FIGS. 3A-3D are schematic diagrams illustrating a method for manufacturing a patterned structural body that is an example of the invention.
Figure 3B:
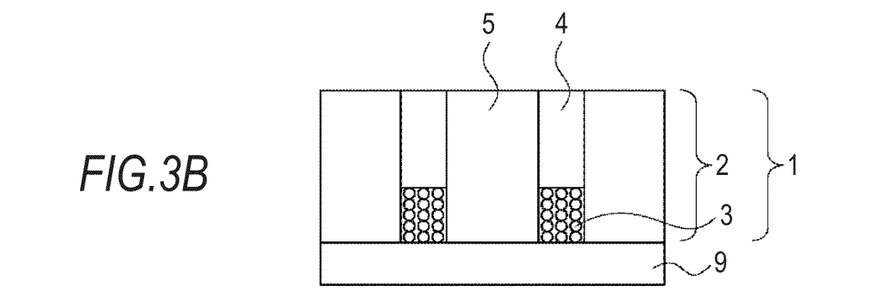

In the step (I), a composite is prepared that includes a base material 9 that is the object of forming a pattern and a metal structural body-containing polymer film 1 that is obtained according to the second aspect of the invention and is in contact with the base material 9 (FIGS. 3A-B). Examples of the material constituting the base material 9 that is the object of forming a pattern include semiconductors such as Si, GaAs, and InP, dielectrics such as glass, quartz, and boron nitride, and carbon. The base material may include a plurality of layers, wherein the layers other than the outermost layer are from the aforementioned materials and the outermost layer is from a polymer, spin-on-glass, a metal, an oxide, a nitride, or a magnetic body. In a case where plating is used in the process (ii) of the second aspect of the invention and the electrode that is used during plating is employed as a base material serving as an object for forming the pattern, the process (I) can be realized by performing the method according to the second aspect of the invention. However, where the base material is different from the electrode used during plating, the base material is brought into contact with the metal structural body-containing polymer film after the method according to the second aspect of the invention has been performed.

Figure 3C:
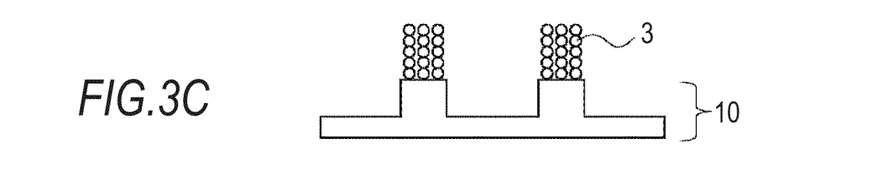

In the step (II), the base material 9 is etched using the metal structural body 3 of the metal structural body-containing polymer film 1 as a mask, and a patterned structural body 10 is obtained in which the metal structural body 3 is present on the surface (FIG. 3C).

Figure 4A:
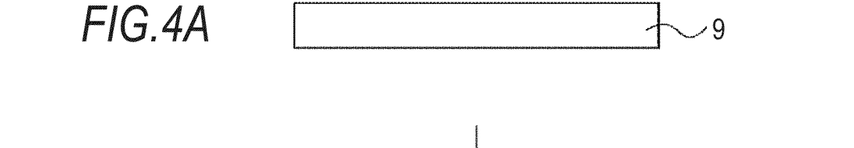
FIGS. 4A-4D are schematic diagrams illustrating a method for manufacturing a patterned structural body that is an example of the invention.
Figure 4B:
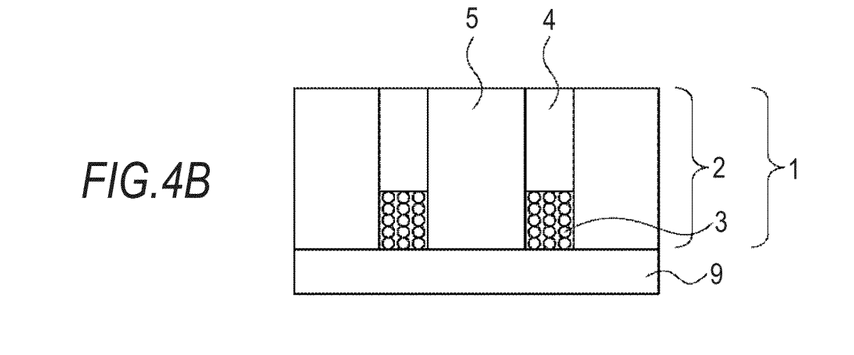
Figure 4C:
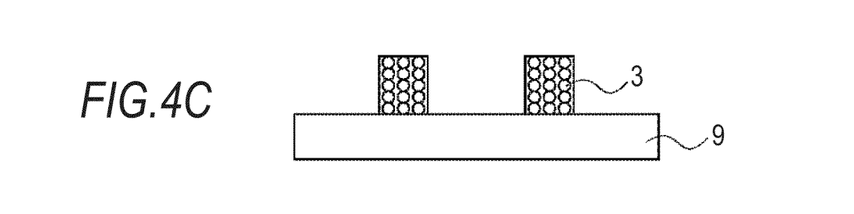
Figure 4D:
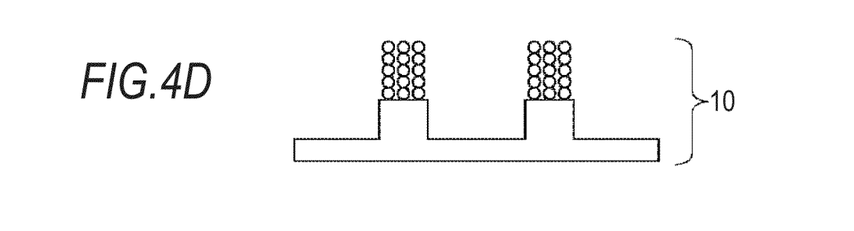

FIGS. 3B-C represent a process in which the base material 9 is etched at the same time as an ion-conductive domain 4 and a non-ion-conductive domain 5 of the metal structural body-containing polymer film 1 are removed. However, it is also possible to use a method by which, as shown in FIG. 4, a composite is prepared that includes the base material 9 and the metal structural body-containing polymer film 1 (FIG. 4B), the ion-conductive domain 4 and non-ion-conductive segment domain 5 of the polymer film 2 constituting the metal structural body-containing polymer film 1 are removed (FIG. 4C), and the base material 9 is then etched (FIG. 4D). The description above assumes that the ion-conductive domain 4 and non-ion-conductive segment 5 of the polymer film 2 are together removed in the process illustrated by FIG. 4C, but the process in which the ion-conductive domain 4 remains, provided that the non-ion-conductive domain is removed, may be also implemented.

In the case where the former method is used, dry etching can be employed as the etching method. In this case, Ar, $O_2$, $CF_4$, $H_2$, $C_2F_6$, $CHF_3$, $CH_2F_2$, $CF_3Br$, $N_2$, $NF_3$, $Cl_2$, $CCl_4$, HBr, and $SF_6$ can be used as the etching gas.

When the latter method is used, the base material 9 can be etched by the above-described etching method after the polymer film 2 has been removed by an appropriate method such as a dry process, a wet process and calcining by heating. Specific examples of the dry process include ozone or UV ozone ashing and oxygen plasma ashing. Specific examples of the wet process include a method of immersing into a solvent that can dissolve the polymer film of the metal structural body-containing polymer film.

Figure 3D:
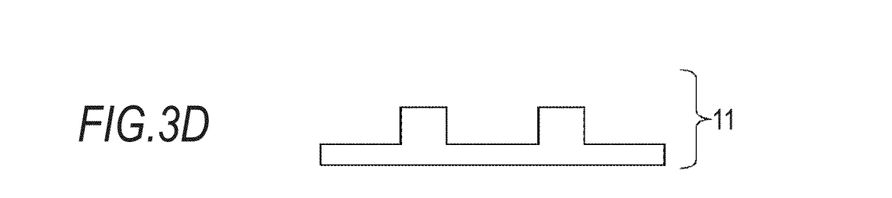

A process of removing the metal structural body 3 may be implemented after the process (I) and process (II). By removing the metal structural body 3, it is possible to obtain the patterned structural body 11 in which a pattern is formed in the base material 9 (FIG. 3D).

EXAMPLES

The invention will be described below in greater detail by examples thereof, but the method in accordance with the present invention is not limited to these examples.

Example 1

1-(1) A total of 50 mL of a dichloroethane solution of chlorosulfonic acid (0.76 mL) was added to 200 mL of dichloroethane solution of 10.0 g of a commercial block copolymer (manufactured by Kuraray Co., Ltd., SEPTON SEEPS (SEPTON is a trade name registered by Kuraray Co., Ltd.)) represented by General Formula (0) and sulfonation was conducted for 2 h. The reaction solution was reprecipitated in hexane, washed, and dried to give a compound represented by General Formula (1).

General Formula (0)

General Formula (1)

1-(2) A total of 30 g of acetoxystyrene, 201 μL of dimethyl-2,6-dibromoheptanedioate, 386 μL of pentamethyldiethylenetriamine, and 265 mg of copper (I) bromide were mixed and a polymerization reaction was conducted at a temperature of 100° C. and stopped in 2.5 h. The product was diluted with chloroform, the catalyst was removed with an alumina column, and reprecipitation purification to cold methanol was performed. A total of 2.5 g of the compound obtained, 11.6 g of styrene, 232 μL of pentamethyldiethylenetriamine, and 160 mg of copper (I) bromide were mixed, and the mixture was degassed and polymerized (110° C./1.3 h), the polymerization was stopped, and purification was conducted. A total of 4.0 mL of hydrazine monohydrate was stirred for 2 h together with an 1,4-dioxane solution of the compound (2.0 g), followed by reprecipitation in water, washing, and drying. A DMF solution of 6.38 mg of propanesultone and 523 mg of NaH was added to a DMF solution of the compound obtained (1.10 g), the reaction was conducted for 3 h at 65° C., the DMF solution of 6.38 mg of propanesultone and 523 mg of NaH was added again, the reaction was conducted for 2 h and purified water was added, followed by reprecipitation with methanol, filtration, drying, and dispersion in tetrahydrofuran. An ion-exchange resin was then added, followed by reprecipitation with hexane and drying. As a result, the compound represented by General Formula (2) was obtained.

General Formula (2)

1-(3) A total of 30 g of tert-butyl acrylate, 509 μL of dimethyl-2,6-dibromoheptanedioate, 254 μL of hexamethyltriethylenetetraamine, 8.1 g of DMF, and 254 mg of copper (I) bromide were mixed and polymerized for 2.8 h at 70° C. The polymerization was stopped and purification was conducted. A total of 4.0 g (0.381 mmol) of the compound obtained, 23.8 g of styrene, 207 μL of hexamethyltriethylenetetraamine, and 109 mg of copper (I) bromide were mixed, frozen, degassed, and polymerized (100° C./3.75 h), the polymerization was stopped, and purification was conducted. A total of 4.0 mL of hydrazine monohydrate was stirred for 2 h together with an 1,4-dioxane solution of the compound (2.0 g), followed by reprecipitation in water, washing, and drying. A DMF solution of 6.38 mg of propanesultone and 523 mg of NaH was added to a DMF solution of the compound obtained (1.10 g), the reaction was conducted for 3 h at 65° C., the DMF solution of 6.38 mg of propanesultone and 523 mg of NaH was added again, the reaction as conducted for 2 h and purified water was added, followed by reprecipitation with methanol, filtration, drying, and dispersion in THF. An ion-exchange resin was then added, followed by reprecipitation with hexane and drying. As a result, the compound represented by General Formula (3) was obtained.

General Formula (3)

The identification of block copolymers in Examples 1-(1) to (3) was conducted by NMR, gel permeation chromatography, and inductively coupled plasma analysis.

Reference Example 1

Figure 5:
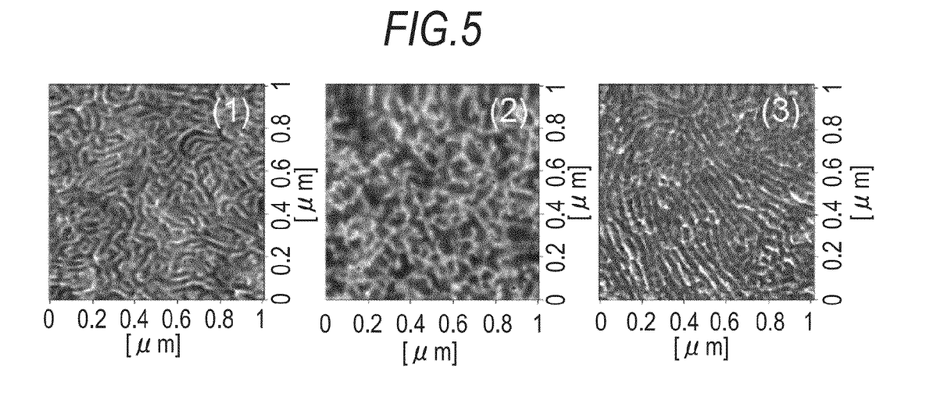
FIG. 5 is an atomic force microscopic phase image of the polymer film obtained in Reference Example 1.

The block copolymers represented by General Formulas (1)-(3) were dissolved in a solvent including methanol and tetrahydrofuran at a ratio of 8:2, the solvents were coated by a bar coating method on substrates obtained by sputtering Ti/Al on commercial slide glass, and polymer films including ion-conductive domains and non-ion-conductive domains were obtained. Phase images of the polymer films obtained under an atomic force microscope are shown in FIG. 5. FIG. 5(1) shows a polymer film formed by the block copolymer represented by General Formula (1), FIG. 5(2) shows a polymer film formed by the block copolymer represented by General Formula (2), and FIG. 5(3) shows a polymer film formed by the block copolymer represented by General Formula (3). In FIG. 5(1), relatively soft sites shown by a dark color indicate non-ion-conductive domains, and relatively hard sites represented by a light color indicate ion-conductive domains, whereas in FIGS. 5(2) and (3) relatively soft sites shown by a dark color indicate ion-conductive domains, and relatively hard sites represented by a light color indicate non-ion-conductive domains. These results confirm that the microphase-separated structure has been formed in all the polymer films.

Figure 6:
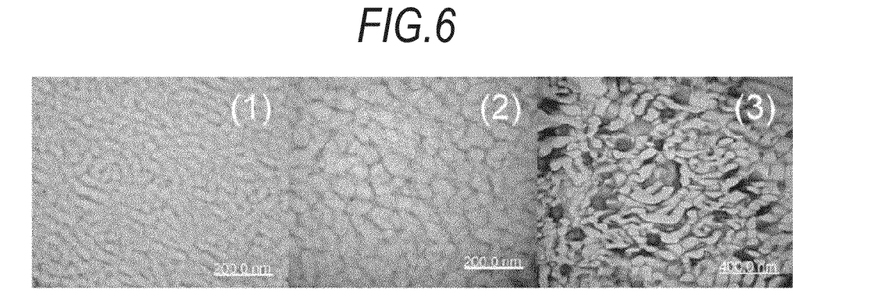
FIG. 6 is a transmission electron microscopic image of the polymer film obtained in Reference Example 1.

Further, block copolymers represented by General Formulas (1)-(3) were dissolved in a solvent including methanol and tetrahydrofuran at a ratio of 8:2, the solvents were coated by a casting method on substrates obtained by sputtering Ti/Au on commercial slide glass, and polymer films including ion-conductive domains and non-ion-conductive domains were obtained. The polymer films obtained were peeled off from the substrates. FIG. 6 shows transmission electron microscopic images obtained by cutting with a microtome. FIG. 6(1) shows a polymer film formed by the block copolymer represented by General Formula (1), FIG. 6(2) shows a polymer film formed by the block copolymer represented by General Formula (2), and FIG. 6(3) shows a polymer film formed by the block copolymer represented by General Formula (3). The polymer films were dyed with an aqueous solution of phosphotungstic acid. In FIG. 6, dense-color sites indicate ion-conductive domains with a strong affinity to the aqueous solution of phosphotungstic acid that was used for dyeing, and the light color indicates non-ion-conductive domains. These photographs also confirm that the microphase-separated structure has been formed in all the polymer films. Observations of the polymer films under vacuum also demonstrated the presence of fine paths created by continuously connected ion-conductive domains.

Example 2

The block copolymers represented by General Formulas (1)-(3) were dissolved in a solvent including methanol and tetrahydrofuran at a ratio of 8:2, the solvents were coated by a bar coating method on substrates obtained by sputtering Ti/Au on commercial slide glass, and polymer films including ion-conductive domains and non-ion-conductive domains were formed. Bipolar cells were then formed in which the substrate having the polymer film formed thereon was used as a working electrode (electrode surface area 0.48 cm$^2$), and a metal wire was used as a counter electrode. Pt was used for the metal wire of the counter electrode, and a 0.05M aqueous solution of $AgNO_3$ was used as an electrolytic solution injected into the cell.

Figure 7:
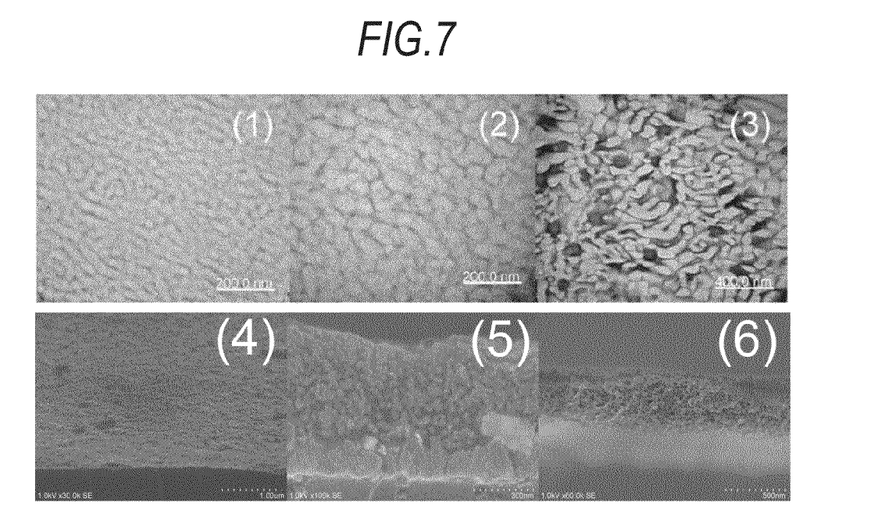
FIG. 7 is a scanning electron microscopic image of a cross section of the metal structural body-containing polymer film with an exposed metal structural body that is obtained in Example 2.
Figure 8:
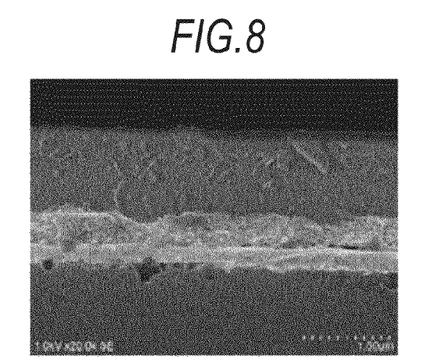
FIG. 8 is a scanning electron microscopic image of a cross section of the metal structural body-containing polymer film with an exposed metal structural body that is obtained in Example 2.

The electrodes were connected to a potentio/galvanostat and electroplating was conducted for 20 sec at −2 V in the atmosphere at room temperature. In the electroplating, Ag was deposited on the polymer films including the block copolymers represented by General Formulas (1)-(3) and metal structural body-containing polymer films were formed on the substrate surface. The substrates were washed with water, dried, and then immersed overnight in dimethylacetamide. Scanning electron microscopic images of cross sections of the metal structural body-containing polymer films where Ag was exposed are shown in FIGS. 7(1) to (6). FIGS. 7(1) and (4) show a metal structural body-containing polymer film that includes the polymer film including the block copolymer represented by General Formula (1) and Ag, FIGS. 7(2) and (5) show a metal structural body-containing polymer film that includes the polymer film including the block copolymer represented by General Formula (2) and Ag, and FIGS. 7(3) and (6) show a metal structural body-containing polymer film that includes the polymer film including the block copolymer represented by General Formula (3) and Ag. The shape comparison of the atomic force microscope phase image shown in FIG. 5 with the scanning electron microscopic image shown in FIG. 6 confirms that the metal was deposited on ion-conductive domains by electroplating. Thus, the metal structural body-containing metal structural body-containing polymer film that was formed herein was localized in the ion-conductive domains of the polymer film. Further, the images of the interface with the substrate that are shown in FIGS. 7(4) to (6) (deposited metal is at the top and the substrate is at the bottom) confirm that at least part of the metal structural bodies is positioned at least on one main surface of the polymer film (in this case, interface with the substrate) and a portion that is not positioned on the surface is continuous with the portion that is positioned on the surface. This result can be explained as follows. Because the metal is deposited on the conductor surface via electrons provided from the conductor, the metal is inevitably positioned on the main surface, and the portion that is not positioned on the surface is deposited on the surface of the deposited metal by receiving electrons from the metal deposited via electrons provided from the conductor. FIG. 8 shows a low-magnification (20,000×) image of the metal structural body-containing polymer film that includes the polymer film including the block copolymer represented by General Formula (2) and Ag. In the figure, the dark portion below the image shows the electrode glass, the light portion thereupon shows the electrode gold, the light portion thereupon shows the deposited Ag, the dark portion thereupon shown the remaining polymer, and the black portion thereupon shows the air.

Example 3

The metal structural body-containing polymer films were obtained in the same manner as in Example 2, except that Ni was used as the metal wire of the counter electrode, aqueous solutions of 11 gL$^{-1}$ $NiSO_4$, 1.9 μL$^{-1}$ $NiCl_2$, and 0.0015 gL$^{-1}$ boric acid were used as electrolytic solutions injected into the cell, and constant-current electroplating was conducted for 20 sec at 3.25 mA at room temperature in the air.

Figure 9:
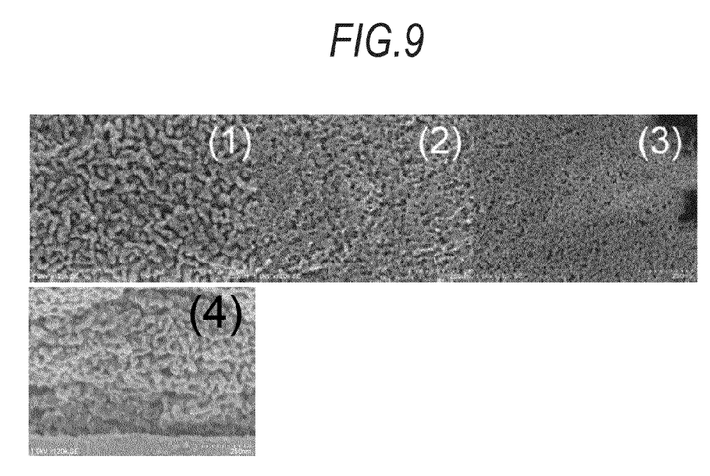
FIG. 9 is a scanning electron microscopic image of a cross section of the metal structural body-containing polymer film with an exposed metal structural body that is obtained in Example 3.

An electrode having on the surface thereof a metal structural body-containing polymer film that used a film including the block copolymer represented by General Formula (1) as the polymer film was immersed overnight in dimethylacetamide, washed with water, and dried. The metal structural body-containing polymer films that used films including the block copolymers represented by General Formulas (2) and (3) as the polymer film were calcined for 30 min at 450° C. Scanning electron microscopic images of cross-sections of the metal structural body obtained are shown in FIGS. 9(1) to (4). FIGS. 9(1) and (4) show a metal structural body (Ni) obtained by removing the polymer film from the metal structural body-containing polymer film that includes the polymer film including the block copolymer represented by General Formula (1) and Ni. FIG. 9(2) shows a metal structural body (Ni) obtained by removing the polymer film from the metal structural body-containing polymer film that includes the polymer film including the block copolymer represented by General Formula (2) and Ni. FIG. 9(3) shows a metal structural body (Ni) obtained by removing the polymer film from the metal structural body-containing polymer film that includes the polymer film including the block copolymer represented by General Formula (3) and Ni. The shape comparison of the atomic force microscopic phase image shown in FIG. 5 with the transmission electron microscopic image shown in FIG. 6 confirms that the metal was deposited on ion-conductive domains by electroplating. Thus, the metal structural body in the metal structural body-containing polymer film that was formed herein was localized in the ion-conductive domains of the polymer film. Further, the images of the interface with the substrate that are shown in FIG. 9(4) (deposited metal is at the top and the substrate is at the bottom) confirm that at least part of the metal structural bodies is positioned at least on one main surface of the polymer film (in this case, interface with the substrate) and a portion that is not positioned on the surface is continuous with the portion that is positioned on the surface. This result can be explained as follows. Because the metal is deposited on the conductor surface via electrons provided from the conductor, the metal is inevitably positioned on the main surface, and the portion that is not positioned on the surface is deposited on the surface of the deposited metal by receiving electrons from the metal deposited via electrons provided from the conductor. These results indicate thin the ion-conductive domains can be also replicated by electroplating in the case where Ni is used as the deposited metal.

Example 4

The electroplating was conducted in the same manner as in Example 2, except that a substrate obtained by vapor depositing Cu on a Si wafer was used as the substrate, only the block copolymer represented by General Formula (1) was used as the block copolymer, a spin coating method was used as a method for applying the solution including the block copolymer, Pt was used as the metal wire of the counter electrode, and a 0.05 M aqueous solution of $SnSO_4$ was used as the electrolytic solution injected into the cell.

Figure 10:
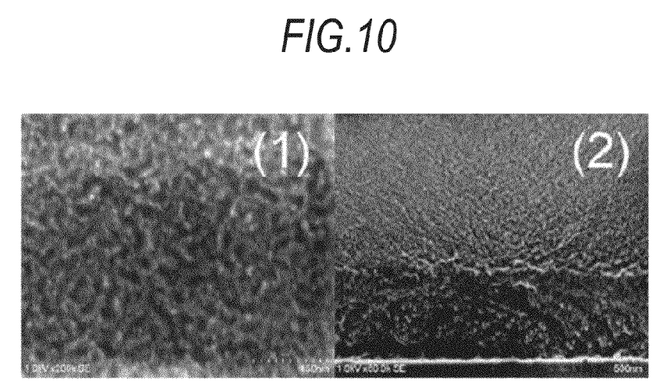
FIG. 10 is a scanning electron microscopic image of a surface and a cross section of the metal structural body-containing polymer film with an exposed metal structural body that is obtained in Example 4.

The electroplating was conducted for 20 sec at a current of 1.92 mA in the air at room temperature. Sn was deposited by electroplating on the polymer film including the block copolymer represented by General Formula (1) and a metal structural body-containing polymer film was obtained. The metal structural body-containing polymer film that used the film including the block copolymer represented by General Formula (1) was then immersed overnight in tetrahydrofuran and Sn was exposed. A scanning electron microscopic image of the surface of the obtained metal structural body is shown in FIG. 10(1), and a scanning electron microscopic image of the cross section is shown in FIG. 10(2). These results indicate that the ion-conductive domains can be also replicated in the case where Sn is used as the deposited metal and that a negative electrode of a lithium ion battery can thus be prepared.

Example 5

Figure 11:
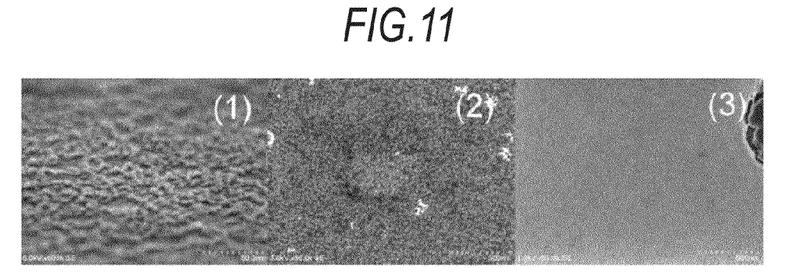
FIG. 11 is a scanning electron microscopic image of a cross section of the metal structural body-containing polymer film with an exposed metal structural body that is obtained in Example 5 and Reference Example 2.
Figure 12:
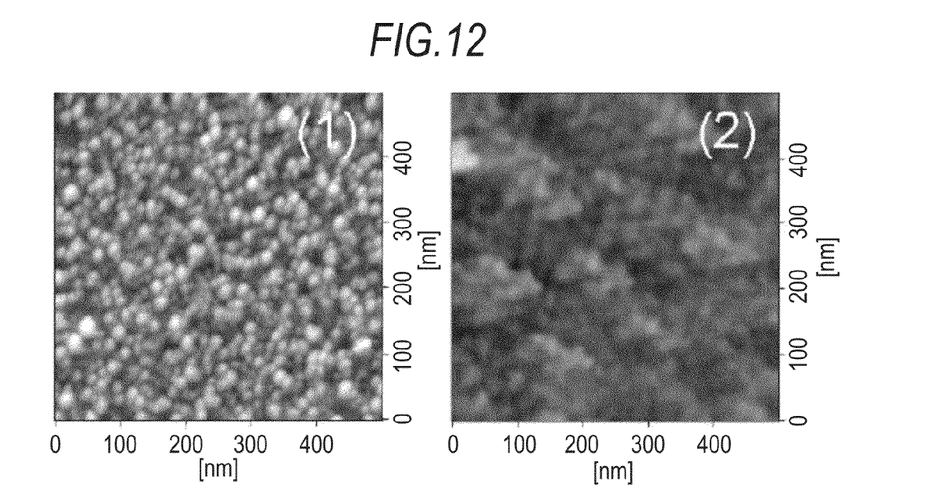
FIG. 12 is an atomic force microscopic shape image of the metal structural body-containing polymer film with an exposed metal structural body that is obtained in Example 5 and Reference Example 2.

An n-Si wafer having Ni that is a metal structural body on the surface was obtained in the same manner as in Example 3, except that an n-Si wafer was used as the substrate, only the block copolymer represented by General Formula (1) was used as the block copolymer, spin coating was used for coating the solution including the block copolymer, and the metal structural body-containing polymer film was calcined for 30 min at a temperature of 450° C. FIG. 11(1) is a scanning electron microscopic image of the surface of the calcined metal structural body-containing polymer film in the tilted observation image, and FIG. 11(2)—in the top observation image. FIG. 12(1) shows an atomic force microscopic shape image (height scale is 6 nm) of the calcined metal structural body-containing polymer film. These images confirm that at least part of the metal structural bodies is positioned at least on one main surface of the polymer film (in this case, interface with the substrate) and a portion that is not positioned on the surface is continuous with the portion that is positioned on the surface.

Then, oxygen plasma treatment was conducted by using Ni of the calcined metal structural body-containing polymer film as a mask and the n-Si wafer that is in contact with the calcined metal structural body-containing polymer film as a substrate that is the object of patterning. Ion etching was then conduced and a patterned structural body was obtained. The plasma treatment was conducted under the following conditions: $O_2$=50, 0.5 Pa, 500/0 W, 10 sec. The etching was conducted under the following conditions: $SF_6/CHF_2$=4/46, 1 Pa, 250/20 W, 10-30 sec.

Figure 13:
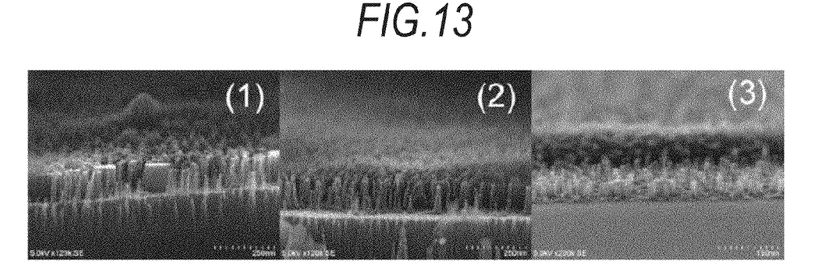
FIG. 13 is a scanning electron image of a patterned structural body obtained in Example 5.

A scanning electron microscopic image (tilted observations) of the obtained patterned structural body is shown in FIG. 13.

Reference Example 2

An n-Si wafer having a polymer film formed thereon was prepared in the same manner as in Example 5, except that Ni electroplating was not conducted. Calcining was conducted for 30 min at 450° C. and a sample from which the polymer film was removed was prepared to observe the surface of the n-Si wafer.

FIG. 11(3) shows a scanning electron microscopic image of the surface of the n-Si wafer that was calcined to remove the polymer film. FIG. 12(2) shows an atomic force microscopic shape image (height scale 6 nm) of the obtained calcined n-Si wafer.

Comparative Example 1

Figure 14:
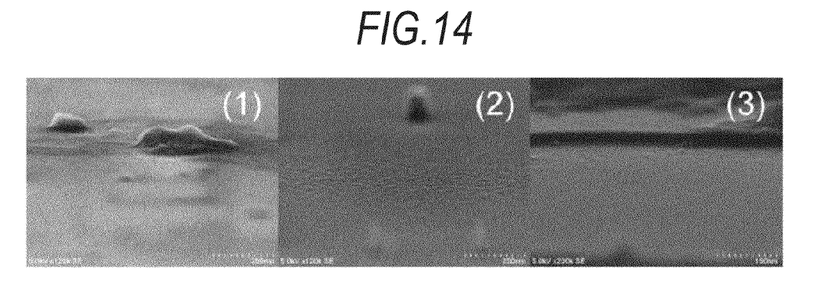
FIG. 14 is a scanning electron image of a patterned structural body obtained in Comparative Example 1.

The oxygen plasma treatment and ion etching were conducted by the methods similar to those of Example 5 by using the Si substrate having formed thereon a polymer film that was obtained in Reference Example 2 as a patterning object. A scanning microscopic image (tilted observations) of the patterned structural body thus obtained is shown in FIG. 14. In this case no pattern was formed on the Si substrate surface.

Example 5 and Comparative Example 1 demonstrate that a finely patterned structural body can be formed by forming a metal structural body-containing polymer film on a substrate and conducting etching by using the metal structural body as a mask.

The metal structural body-containing polymer film in accordance with the present invention can be used as an anisotropic electrically conductive film, an anisotropic thermally conductive film, an information recording medium, a battery electrode, and an optical material.

With the metal structural body-containing polymer film in accordance with the present invention, it is possible to conduct morphological evaluation of domains of a polymer film having a microphase-separated structure.

Further, the patterned structural body obtained in accordance with the present invention can be used as an antireflective structural body, an electronic circuit, or a casting mold for producing molded bodies.

The invention can provide a method for manufacturing a patterned structural body by which a finely patterned structural body can be manufactured, a metal structural body-containing polymer film that can be used in the manufacture of the patterned structural body, and a method for manufacturing such as polymer film.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-316040, filed Dec. 11, 2008, which is hereby incorporated by reference herein in its entirety.

What is claimed is:
1. A method for manufacturing a patterned structural body, comprising the steps of:
preparing a metal structural body-containing polymer film by:
preparing a polymer film that includes a block copolymer having an ion-conductive segment and a non-ion- conductive segment and has a microphase-separated structure including ion-conductive domains and non-ion-conductive domains; and forming a metal structural body localized at the ion-conductive domains;

providing the metal structural body-containing polymer film into contact with a base material and producing a composite body including the metal structural body-containing polymer film and the base material; and etching the base material by using the metal structural body as a mask.

2. The method for manufacturing a patterned structural body according to claim 1, further comprising a step of removing the polymer film of the metal structural body-containing polymer film between a step of producing the composite body and etching the base material by using the metal structural body as a mask.

3. The method for manufacturing a patterned structural body according to claim 1, further comprising a step of removing the metal structural body after the step of etching the base material by using the metal structural body as a mask.

4. The method for manufacturing a patterned structural body according to claim 1, wherein the metal structural body of the metal structural body-containing polymer film and the base material are in contact with each other.

5. The method for manufacturing a patterned structural body according to claim 1, wherein the ion conductive segment is formed from monomers obtained by adding an ion exchange group to a diene monomer or an olefin monomer, and the non-ion conductive segment is formed from monomers comprising one or more of acrylic acid esters, methacrylic acid esters, styrene, conjugated dienes and vinyl ester compounds.

6. The method for manufacturing a patterned structural body according to claim 1, wherein the metal structural body comprises at least one of Ni, Ag, Sn, Cu, Zn, Cr, Au, Co and Fe as a main component.

7. The method for manufacturing a patterned structural body according to claim 1, wherein the microphase-separated structure is a periodic self-organized structure of 1 nm to 5 nm.

8. The method for manufacturing a patterned structural body according to claim 1, wherein forming the metal structural body localized at the ion-conductive domains comprises plating the metal structural body on the ion-conductive methods by at least one of an electroplating, electroless plating and substitution plating method.

9. The method for manufacturing a patterned structural body according to claim 1, wherein 80% or more of the metal structural body is present in the ion-conductive domains.

* * * * *